United States Patent [19]

Simon et al.

[11] 4,096,224

[45] Jun. 20, 1978

[54] MOLDED STYRENE POLYMER ARTICLES FROM VACUUM-FORMED OR THERMOFORMED S-B-S BLOCK COPOLYMER SHEETS

[75] Inventors: Günter Simon; Walter Widmaier, both of Marl; Karl-Ulrich Reichert, Lippramsdorf, all of Germany

[73] Assignee: Chemische Werke Huls Aktiengesellschaft, Marl, Germany

[21] Appl. No.: 683,637

[22] Filed: May 5, 1976

[30] Foreign Application Priority Data

May 17, 1975  Germany .............................. 2522190

[51] Int. Cl.² .............................................. B29C 23/00
[52] U.S. Cl. ..................................... 264/92; 264/101; 264/176 R
[58] Field of Search .............. 264/92, 176, 101, 210 R

[56] References Cited

U.S. PATENT DOCUMENTS

| | | | |
|---|---|---|---|
| 3,709,967 | 1/1973 | Held, Jr. ................................. | 264/92 |
| 3,853,978 | 12/1974 | Horie et al. ............................ | 264/92 |
| 3,957,940 | 5/1976 | Schubert et al. ...................... | 264/92 |

*Primary Examiner*—Donald J. Arnold
*Attorney, Agent, or Firm*—Gilbert L. Wells

[57] ABSTRACT

Sheets produced by the extrusion of a mixture of about 85 – 95 percent by weight of polystyrene or semi-impact-resistant polystyrene and about 5 – 15 percent by weight of a diene-styrene block copolymer having the structure S-B-S wherein S represents the styrene structure and B represents the butadiene or isoprene structure are used for the manufacture of molded articles in the vacuum-forming or thermoforming method.

10 Claims, No Drawings

MOLDED STYRENE POLYMER ARTICLES FROM VACUUM-FORMED OR THERMOFORMED S-B-S BLOCK COPOLYMER SHEETS

CROSS REFERENCE TO A RELATED APPLICATION

Applicants claim priority under 35 U.S.C. 119 for Application P 25 22 190.3, filed May 17, 1975 in the Patent Office of the Federal Republic of Germany.

BACKGROUND OF THE INVENTION

The present invention relates to the use of sheets for the production of molded articles according to the vacuum-forming or thermoforming method, made up of mixtures of polystyrene and diene-styrene block copolymers of the type S - B - S, wherein S represents the styrene structure and B represents the butadiene or isoprene structure.

The state of the art of impact-resistant types of polystyrene may be ascertained by reference to British Pat. No. 1,350,908 and W. German Published Patent Applications Nos. 1,569,311; 1,669,662; 1,694,879; 2,055,891; and 2,163,248, the disclosures of which are incorporated herein.

The state of the art of S - B - S block copolymers useful in the present invention may be ascertained by reference to the Kirk-Othmer "Encyclopedia of Chemical Technology", 2nd Ed., Supplement Volume (1971), — 910-932, under the section "Styrene-Butadiene Solution Copolymers", particularly pp 916-932 wherein the preparation of block copolymers is disclosed, and U.S. Pat. Nos. 3,078,254; 3,251,905; and 3,265,765, the disclosures of which are incorporated herein.

The state of the art of thermoforming may be ascertained by reference to Kirk-Othmer ibid, Vol. 14 (1967), p. 305, and the article of Hanna & Lomax in Modern Plastics, Edition 36, Vol. 6, p. 111 (1959). The state of the art of processing of plastics may be ascertained by reference to Kirk-Othmer ibid, Vol. 15 (1968), pp. 802-807.

It is conventional to render polystyrene less susceptible to impact and shock stresses by the addition of elastomeric materials. Such so-called impact resistant polystyrene types are manufactured, as is known, by intermixing styrene homo- or co- or graft polymers with rubber-elastic compounds. However, it is also known to produce impact-resistant types of polystyrene by graft polymerization. It is furthermore basically conventional to utilize so-called butadiene-styrene segment or block copolymers as the elastomeric component which imparts impact resistance. In this connection, one differentiates between the so-called S -B and S -B -S types, wherein S represents the styrene structure and B represents the diene structure. The proportion of plasticizing butadiene or isoprene in these block copolymers generally varies between 50 and 85, preferably between 55 and 80 percent by weight.

The impact-resistant types of polystyrene obtained by the mixing of polystyrene and block copolymers have not as yet been satisfactory, however, in the manufacture of molded articles with respect to their impact strength. Thus, with the proportion of 8 percent by weight of block copolymer the notched impact strength is merely 3.9 cm · kg/cm, as disclosed in W. German Published Patent Application No. 1,569,311 at Table III.

Consequently, to improve this characteristic, the block copolymers have been mixed with other impact-resistant polystyrene types, such as disclosed in W. German Published Patent Applications Nos. 1,694,879 and 1,669,662. Mixtures have also been produced of impact-resistant polystyrene, homopolystyrene, and block polymers, as disclosed in British Pat. No. 1,350,908. Also, to improve the situation, attempts have been made to incorporate additionally a lubricant, as disclosed in W. German Published Applications Nos. 2,055,891 and 2,163,248. As can be seen from the state of the art, the molding compositions, in order to attain comparable values for the impact strength with customary impact resistant types of polystyrene, require additions of 20 and more percent by weight of block copolymers to the styrene homopolymer as compared to a rubber proportion of about 8 percent by weight with comparable values.

SUMMARY OF THE INVENTION

Having in mind the limitations of the prior art, it has now been found in the present invention that impact-resistant molded articles with high transparency and a glossy surface are obtained by processing sheets produced from mixtures of 85 - 95 percent by weight of polystyrene and 5 - 15 percent by weight of a diene-styrene block copolymer of the type S-B-S, wherein S represents the styrene structure and B represents butadiene or isoprene structure, in accordance with the thermoforming method, into molded articles.

The sheets of the present invention have a thickness of about 0.2 to 2.0 mm and preferably 0.5 to 1.0 mm.

Suitable block copolymers of the type S-B-S, obtainable commercially, possess RSV values in toluene (c = 0.2 g./dl.) of between 0.80 and 1.30, and diene contents of between 55 percent and 80 percent, wherein isoprene or preferably butadiene is contained as the diene. The molecular weight, determined by gel chromatography, ranges between about 60,000 and 130,000. These S-B-S block polymers are disclosed in the technical bulletin RBX/73/5 (G) of Deutsche Shell Chemie GmbH, 6000 Frankfurt/Main (West-Germany).

DESCRIPTION OF THE PREFERRED EMBODIMENTS

With the use of the higher molecular block copolymers of the type S-B-S, i.e. those having an RSV value of higher than 1.0, preferably larger than 1.15, the strength becomes apparent with amounts starting with 5 percent by weight in the mixture up to 15 percent by weight. However, here too, it is advantageous to use 8 - 15 percent by weight of the block copolymer. With the use of the low molecular block copolymers of the S-B-S type, however, it is advantageous to employ more than 5 percent by weight, up to about 15 percent by weight, preferably 10 - 15 percent by weight.

As the styrene polymers, the homopolymer of styrene is preferably used having K-values (inherent viscosities) of between about 55 and 70, preferably between 60 and 68. However, it is also possible to use so-called semi-impact-resistant polystyrene types wherein the elastomer proportion is not above 5 percent. Suitable types of elastomers are the customary types of polybutadiene or butadiene-styrene, wherein especially graft copolymers are utilized as the types of polystyrene. However, so-called blends can also be employed.

Copolymers of styrene are less suitable, since the necessary increased processing temperatures lead to a growing damage to the block copolymer.

The styrene polymers can contain, as usual, up to 8 percent by weight, based on the mixture, of the customary plasticizers from the manufacturing procedure thereof. Examples of suitable plasticizers are paraffin oil, esters of phthalic acid, esters of stearic acid. The plasticizing agents, however, are not incorporated subsequently into the mixture or into the styrene polymers, since this does not result in the desired improvement. Preferably, the block copolymers are used in amounts of about 8 – 15 percent by weight and the aforementioned styrene polymers are utilized correspondingly in quantities of about 85 – 92 percent by weight.

The mixture can be produced in accordance with the customary methods, i.e. in masticators, on rolling mills, and directly in the extruder used for the sheet extrusion, insofar as the mixing power of the latter is sufficient. Customarily, temperatures of 200° C should essentially not be exceeded in this procedure.

The production of the flat sheeting takes place in accordance with the extrusion methods customary for impact-resistant polystyrene.

The styrene homopolymer used herein can contain the usual additives, such as coloring agents and/or antistats.

Only by the use of the mixtures in the manufacture of the molded articles according to the vacuum-forming method is it possible to obtain molded articles having excellent strength properties, high transparency, and a glossy surface.

The invention is further explained by the following specific examples.

EXAMPLE 1

On a mixing roll mill, blends are prepared from 85 parts by weight of a homopolymer of styrene (Vicat softening temperature 88° C, $I_5$-value 8 g./10 min. (ASTM 1238-57 T), temperature 135° C, rolling time 15 minutes) and two different commercial styrene-butadiene-styrene block copolymers S-B-S a) RSV value 1.19 (c = 0.2 g./dl. measured in toluene), butadiene content 67 percent; (S-B-S b) RSV value 0.84 (c = 0.2 g./dl. measured in toluene), butadiene content 57 percent. The rolled sheet is ground into a crushed granulated material and a sheet having a thickness of 1 mm. is produced therefrom. From this sheet, drinking cups (6 g.) are formed by vacuum-forming method.

The Table below indicates the results of the tests as compared to impact-resistant types of polystyrene according to the prior art.

Test A represents the results obtained with a normal polystyrene and test D indicates the results obtained with a commercially available, impact-resistant polystyrene having approximately 8 percent elastomer content. Tests B and C are those according to the present invention. It can be seen therefrom that improved values could be obtained only by the additional processing according to the thermoforming method in conjunction with the mixture ratio.

Impact strength and notched impact strength according to DIN (German Industrial Standard) 54 453 naturally can only be employed for describing the strength properties of the raw material. To determine the strength of vacuum-formed drinking cups, a 100 g. pendulum hammer was allowed to fall on a certain point of the lateral surface. The falling height at which 50 percent of the cups were broken up has been indicated in the Tables.

The greatly increased relationship of the pendulum falling height to the impact or notched impact strength clearly demonstrates the strength-increasing effect of the vacuum-forming step in the case of the mixtures of the present invention.

TABLE 1.

|  | (A) | (B) | (C) | (D) |
|---|---|---|---|---|
| Homopolystyrene | 100 | 85 | 85 | — |
| S-B-S - Increased MW(a) | — | 15 | — | — |
| S-B-S - Lowered MW(b) | — | — | 15 | — |
| Impact-Resistant Polystyrene 8 percent Elastomer | — | — | — | 100 |
| Impact strength [kp. cm/cm²(+)] (DIN 54 453) | 20 | 20 | 19 | 85 |
| Notched Impact Strength(+) (DIN 54 453) | 2 | 3.3 | 3.1 | 7.0 |
| Pendulum Impact Height on the side of the Vacuum-Formed Cup; Pendulum Weight 100 g. . (cm) | <5 | >80 no breakage | >80 no breakage | 50 |

(+)Before vacuum-forming.

EXAMPLE 2

On a mixing roll mill, using the components set forth in Example 1, in different mixture ratios, sheets were produced and therefrom subsequently drinking cups were manufactured in accordance with the vacuum-forming method.

S-B-S (c) RSV value 0.92 (c = 0.2 g.dl. measured in toluene), butadiene content 70 percent.

S-B-S (d) RSV value 1.22 (c = 0.2 g.dl. measured in toluene), isoprene content 78.2 percent.

TABLE II

|  | (A) | (B) | (E) | (C) | (D) | (F) |
|---|---|---|---|---|---|---|
| Homopolystyrene | 100 | 85 | 90 | 85 | — | 90 |
| S-B-S - High MW(a) | — | 15 | — | — | — | — |
| S-B-S - Low MW(b) | — | — | — | 15 | — | — |
| S-B-S-Low MW(c) | — | — | 10 | — | — | — |
| S-B-S - Isoprene Basis (d) | — | — | — | — | — | 10 |
| Impact-Resistant Polystyrene, 8 percent Elastomer | — | — | — | — | 100 | — |
| Impact Strength [kp . cm/cm²] | 20 | 20 | 23 | 19 | 85 | 29 |
| Notched Impact Strength [kp . cm/cm²] | 2 | 3.3 | 2.5 | 3.1 | 7.0 | 4.1 |
| Pendulum Impact [cm.Falling Height] | <5 | >80 | >80 | >80 | 50 | 60 |

Tests A and D are comparative examples; Tests B and C correspond to those of Example 1. Test B demonstrates that with blends in a proportion of 90 percent by weight of homopolystyrene and 10 percent by weight of butadiene-styrene block copolymer (S-B-S), the strength characteristics according to the customary test methods are entirely inadequate and that the vacuum-formed cups are breakproof.

As compared to cups from comparative test (D), those of blends (B), (C), (E), (F) are transparent to glass-clear and possess a high surface gloss.

EXAMPLE 3

A mixture was processed made up of polystyrene granules and a butadiene-styrene block copolymer of low molecular weight present in granulated form (S-B-S b) in accordance with Test 2(E) by means of a 90-type sheeting extruder (25 D). The granulated mixture was readily processed into sheets and then further worked into cups. The pendulum impact values on these cups were 60 cm.

EXAMPLE 4

By replacing the homopolystyrene partially or entirely by impact-resistant or semi-impact-resistant polystyrene, it is found that with the use of impact-resistant polystyrene (Comparative Test J) there is no improvement obtained in connection with the vacuum-formed molded article. With the use of so-called semi-impact-resistant polystyrene (Tests G and H), however, a marked improvement is registered; of course, the transparency of the molded articles though is somewhat lesser when using these impact-resistant types.

TABLE III

|  | (A) | (G) | (H) | (J) | (D) |
| --- | --- | --- | --- | --- | --- |
| Homopolystyrene | 100 | — | — | 30 | — |
| Impact-Resistant Polystyrene, 4.5 percent Elastomer Proportion | — | 95 | 90 | — | — |
| Impact-Resistant Polystyrene, 8 percent Elastomer Proportion | — | — | — | 65 | 100 |
| S-B-S(b) | — | 5 | 10 | 5 | — |
| Impact Strength [kp . cm/cm$^2$] | 20 | 68 | 100 | 90 | 85 |
| Notched Impact Strength [kp . cm/cm$^2$] | 2 | 6.1 | 6.6 | 6.5 | 7.0 |
| Pendulum Impact [cm Falling Height] | <5 | >80 | >80 | 35 | 50 |

COMPARATIVE EXAMPLE

A replacement of part of the S-B-S block copolymer by paraffin oil does not lead to the same strength values as with the exclusive use of S-B-S. The paraffin oil is incorporated into the homopolystyrene on a mixing roll mill before adding the S-B-S block copolymer. The Comparative Tests K and L correspond to the state of the art described in W. German Published Patent Applications Nos. 2,055,891 and 2,163,248.

TABLE IV.

|  | (K) | (L) |
| --- | --- | --- |
| Homopolystyrene | 85 | 90 |
| Paraffin Oil | 5 | 5 |
| S-B-S(b) | 10 | 5 |
| Impact Strength [kp . cm/cm$^2$] | 20 | 20 |
| Notched Impact Strength [kp . cm/cm$^2$] | 2.6 | 2.0 |
| Pendulum Impact [cm. Falling Height] | 34 | 12 |

We claim:

1. In the method of manufacturing molded articles comprising thermoforming extruded polystyrene sheets, the improvement comprising the use of sheets having a thickness of about 0.2 to 2.0 mm produced by extruding a mixture of about 85–95 percent by weight of polystyrene and about 5–15 percent by weight of a diene-styrene block copolymer having the structure S-B-S wherein S represents styrene and B represents butadiene or isoprene said block copolymer having a molecular weight of about 60,000 to 130,000; an RSV value in toluene of between 0.80 and 1.30 and a diene content of between 50 and 85 percent.

2. The method of claim 1, wherein said polystyrene is a homopolymer of styrene.

3. The method of claim 1, wherein said diene-styrene block copolymer has a diene proportion of about 55–80 percent by weight.

4. The method of claim 2, wherein said diene-styrene block copolymer has a diene proportion of about 55–80 percent by weight.

5. The method of claim 1, wherein said RSV value is 1.0 to 1.30.

6. The method of claim 1, wherein said RSV value is 1.15 to 1.30.

7. The method of claim 1, wherein said weight of diene-styrene block copolymer is 8–15 percent.

8. The method of claim 1, wherein said sheets have a thickness of about 0.5 to 1.0 mm.

9. The method of claim 2, wherein said homopolymer of styrene has a K value of about 55 to 70.

10. The method of claim 2, wherein said homopolymer of styrene has a K value of about 60 to 68.

* * * * *